US012692086B2

(12) United States Patent
Kwon et al.

(10) Patent No.: US 12,692,086 B2
(45) Date of Patent: Jul. 28, 2026

(54) DRY POWDER FEEDING APPARATUS

(71) Applicant: SAMSUNG SDI CO., LTD., Yongin-si (KR)

(72) Inventors: Ilkyong Kwon, Yongin-si (KR); Jinhyon Lee, Yongin-si (KR); Seunguk Kwon, Yongin-si (KR); Ahram Pyun, Yongin-si (KR); Seunggwon Bang, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 140 days.

(21) Appl. No.: 18/603,295

(22) Filed: Mar. 13, 2024

(65) Prior Publication Data

US 2025/0074712 A1     Mar. 6, 2025

(30) Foreign Application Priority Data

Aug. 28, 2023    (KR) ........................ 10-2023-0112991

(51) Int. Cl.
 B65G 27/16        (2006.01)
 H01M 10/04        (2006.01)
(52) U.S. Cl.
 CPC .......... B65G 27/16 (2013.01); B65G 2201/04 (2013.01); H01M 10/0404 (2013.01)
(58) Field of Classification Search
 CPC .. B65G 27/16; B65G 2201/04; B65G 11/026; B65G 11/166; B65G 27/04; B65G 11/206; B65G 47/18; B65G 2201/042;

B65G 2812/0384; H01M 10/0404; H01M 4/0435; H01M 4/04; Y02E 60/10; B05C 19/04; B29C 43/32; B29C 31/04
See application file for complete search history.

(56) References Cited

U.S. PATENT DOCUMENTS

| | | | | | |
|---|---|---|---|---|---|
| 1,561,632 | A | * | 11/1925 | Woodward | B07B 1/469 |
| | | | | | 209/397 |
| 3,581,871 | A | * | 6/1971 | Forman | B65G 27/00 |
| | | | | | 177/121 |
| 5,211,291 | A | * | 5/1993 | Kelley | B27N 1/00 |
| | | | | | 209/264 |
| 5,819,951 | A | | 10/1998 | Sultanovich et al. | |
| 8,714,362 | B2 | * | 5/2014 | Jones | B07B 1/469 |
| | | | | | 209/265 |

(Continued)

FOREIGN PATENT DOCUMENTS

| | | | |
|---|---|---|---|
| JP | | 48-035024 B1 | 10/1973 |
| JP | | 49-047786 B1 | 12/1974 |

(Continued)

OTHER PUBLICATIONS

European Search Report dated Oct. 8, 2024.

*Primary Examiner* — Donnell A Long
(74) *Attorney, Agent, or Firm* — Lee IP Law, P.C.

(57) ABSTRACT

A dry powder feeding apparatus includes a feeder accommodating a fibrous dry powder, the fibrous dry powder including an active material, a conductive material, and a binder, and a trough adjacent to the feeder, the trough including a bottom and a plurality of bottom pattern portions protruding from an inner surface of the bottom, the bottom of the trough being configured to move the fibrous dry powder discharged from the feeder in a first direction.

19 Claims, 8 Drawing Sheets

(56)                    References Cited

U.S. PATENT DOCUMENTS

|  |  |  |  |  |
|---|---|---|---|---|
| 8,991,618 B2 * | 3/2015 | Green | .................... | F42B 33/10 |
|  |  |  |  | 209/682 |
| 10,259,656 B1 * | 4/2019 | Musil | ................ | B65G 47/1492 |
| 2019/0100380 A1 * | 4/2019 | Helfenstein | ........... | B65G 27/26 |

FOREIGN PATENT DOCUMENTS

| JP | 54-183091 | U | 12/1979 |
|---|---|---|---|
| JP | 02-133625 | U | 11/1990 |
| JP | 06-047225 | U | 6/1994 |
| JP | 2000-304900 | A | 11/2000 |
| JP | 2005-279374 | A | 10/2005 |
| KR | 10-2023-0022038 | A | 2/2023 |
| WO | WO 1998-018571 | A1 | 5/1998 |

* cited by examiner

DRY POWDER FEEDING APPARATUS

CROSS-REFERENCE TO RELATED APPLICATION

This application claims priority to and the benefit of Korean Patent Application No. 10-2023-0112991, filed at the Korean Intellectual Property Office on Aug. 28, 2023, the entire contents of which are incorporated herein by reference.

BACKGROUND

1. Field

The present disclosure relates to a dry powder feeding apparatus.

2. Description of the Related Art

In general, a rechargeable battery is a battery that may be charged and discharged. An apparatus that manufactures a dry electrode for the rechargeable battery that does not use a solvent is desired. For example, a free-standing film for a dry electrode may be manufactured by supplying a fibrous dry powder (including an active material, a binder, and a conductive material) to a roll that performs calendering, and the dry electrode may be manufactured by laminating the free-standing film on a current collector.

SUMMARY

Aspects of example embodiments provide a dry powder feeding apparatus including a feeder that discharges a fibrous dry powder including an active material, a conductive material, and a binder, and a trough that is adjacent to the feeder and includes a bottom surface moving the dry powder discharged from the feeder in a first direction and a plurality of bottom pattern portions protruding from the bottom surface.

The plurality of bottom pattern portions may protrude at an obtuse angle from the bottom surface.

The plurality of bottom pattern portions may form an obtuse angle with respect to the bottom surface in the first direction.

The plurality of bottom pattern portions may be spaced apart from each other in the first direction.

The plurality of bottom pattern portions may extend in a second direction intersecting the first direction in a plan view.

The plurality of bottom pattern portions may have the same shape.

The plurality of bottom pattern portions may have a line shape in a plan view.

The plurality of bottom pattern portions may have a V-shape in a plan view.

The plurality of bottom pattern portions may have an M-shape in a plan view.

The plurality of bottom pattern portions may have different shapes.

The plurality of bottom pattern portions may include a first bottom pattern portion and a second bottom pattern portion spaced apart from each other in the first direction, the first bottom pattern portion may have a V-shape in a plan view, and the second bottom pattern portion may have a line shape in a plan view.

The trough may further include a vibrator that vibrates the bottom surface.

The dry powder feeding apparatus may further include a chute disposed between the feeder and the trough and guiding the dry powder discharged from the feeder to the trough.

The chute may include: a main body including an internal space through which the dry powder passes; and a plurality of internal pattern portions disposed in the internal space.

The main body may further include: an inlet disposed at an upper side of the internal space and through which the dry powder discharged from the feeder is supplied; and an outlet disposed at a lower side of the internal space to discharge the dry powder to the trough and having a wider width than that of the inlet.

The plurality of internal pattern portions may be distributed and disposed in the internal space from the inlet to the outlet.

The plurality of internal pattern portions may have a triangular shape in a third direction intersecting the first direction.

Each of the plurality of internal pattern portions may include a mesh extending from the inlet to an outer region of the outlet.

The mesh may include a first sub-mesh that is adjacent to the inlet and includes the first through hole; a second sub-mesh that extends from the first sub-mesh to the outlet and includes a second through hole larger than the first through hole; and a third sub-mesh that extends from the second sub-mesh to the outlet and includes a third through hole larger than the second through hole.

Other aspects of example embodiments provide a dry powder feeding apparatus including a feeder that discharges a fibrous dry powder including an active material, a conductive material, and a binder; and a trough that is adjacent to the feeder and moves the dry powder discharged from the feeder in one direction; and a chute that is disposed between the feeder and the trough and includes a main body including an internal space that guides the dry powder discharged from the feeder to the trough and a plurality of internal pattern portions disposed in the internal space.

BRIEF DESCRIPTION OF THE DRAWINGS

Features will become apparent to those of skill in the art by describing in detail exemplary embodiments with reference to the attached drawings, in which.

DETAILED DESCRIPTION

Figure 1:
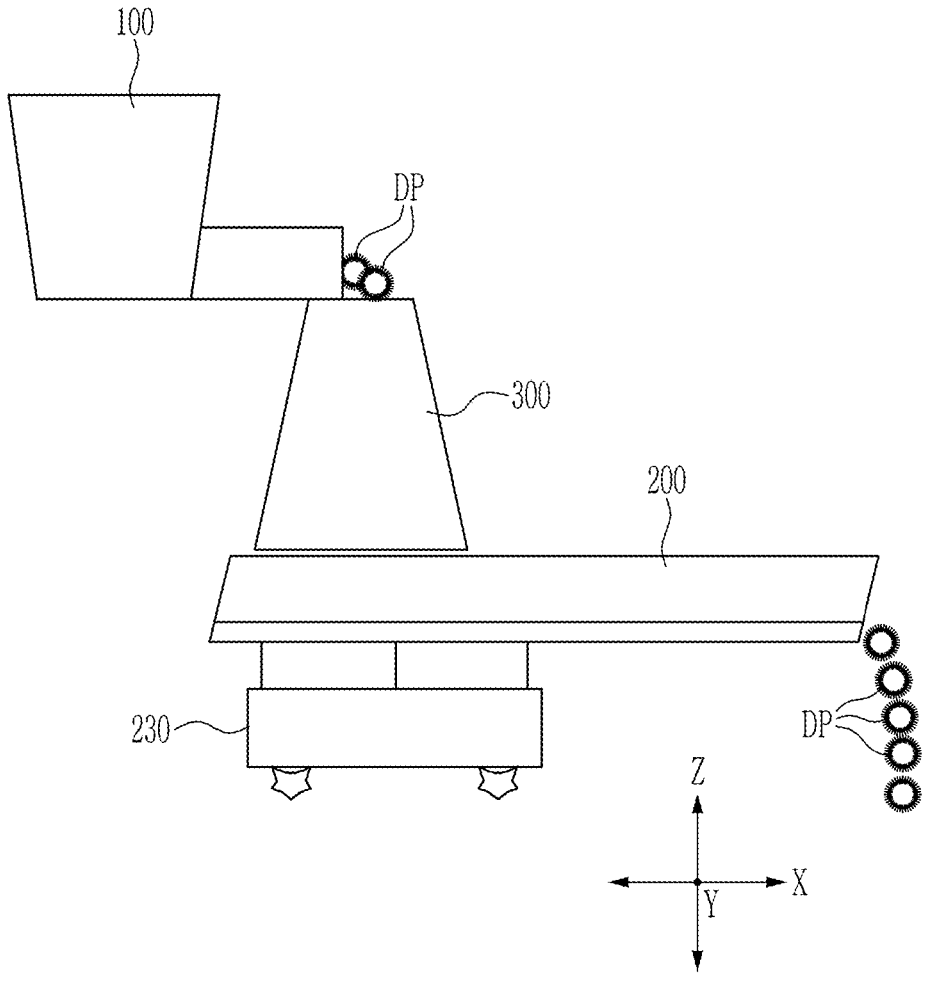
FIG. 1 is a side view showing a dry powder feeding apparatus according to embodiments.

Example embodiments will now be described more fully hereinafter with reference to the accompanying drawings;

however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

In addition, unless explicitly described to the contrary, the word "comprise" and variations such as "comprises" or "comprising" will be understood to imply the inclusion of stated elements but not the exclusion of any other elements.

Hereinafter, a dry powder feeding apparatus according to embodiments will be described with reference to FIGS. 1 to 8.

For example, the dry powder feeding apparatus according to embodiments may be an apparatus that supplies a fibrous dry powder for manufacturing a dry electrode for a rechargeable battery to a roll performing calendering. In another example, the dry powder feeding apparatus according to embodiments may be an apparatus that supplies a fibrous dry powder to various known apparatuses for manufacturing the dry electrode.

FIG. 1 is a side view showing the dry powder feeding apparatus according to embodiments. Referring to FIG. 1, the dry powder feeding apparatus according to embodiments may move a fibrous dry powder DP in a first direction X to supply the fibrous dry powder DP to a dry electrode manufacturing apparatus, e.g., to any suitable dry electrode manufacturing apparatus.

The fibrous dry powder DP may include an active material, a conductive material, and a binder. For example, the active material may include any suitable electrode active materials, the conductive material may include any suitable conductive materials, and the binder may include any suitable fibrous binders, e.g., polytetrafluoroethylene (PTFE) or the like.

For example, the dry electrode manufacturing apparatus adjacent to the dry powder feeding apparatus may be an apparatus including any suitable calendering roll. For example, the calendering roll may be for calendering the fibrous dry powder DP to manufacture a free-standing film.

As illustrated in FIG. 1, a dry powder feeding apparatus according to embodiments may include a feeder 100, a trough 200, and a chute 300. The chute 300 may be between the feeder 100 and the trough 200.

The feeder 100 may discharge the fibrous dry powder DP (which includes the active material, the conductive material, and the binder). The feeder 100 may discharge the dry powder DP in a fixed amount using any suitable fixed amount control portions (or fixed amount control units). The dry powder DP discharged from the feeder 100 may be moved to the trough 200 through the chute 300.

The trough 200 may be adjacent to the feeder 100 with the chute 300 interposed therebetween. The trough 200 may be disposed below the feeder 100 with the chute 300 interposed therebetween, e.g., a distance between a top of the trough 200 and a surface supporting the dry powder feeding apparatus (in the third direction Z) may be smaller than a distance between a bottom of the feeder 100 and the surface supporting the dry powder feeding apparatus (in the third direction Z). The dry powder DP moved from the feeder 100 to the trough 200 may move in the first direction X (e.g., in parallel to the surface supporting the dry powder feeding apparatus) through the trough 200 to be supplied to any suitable dry electrode manufacturing apparatus including a calendering roll or the like.

Figure 2:
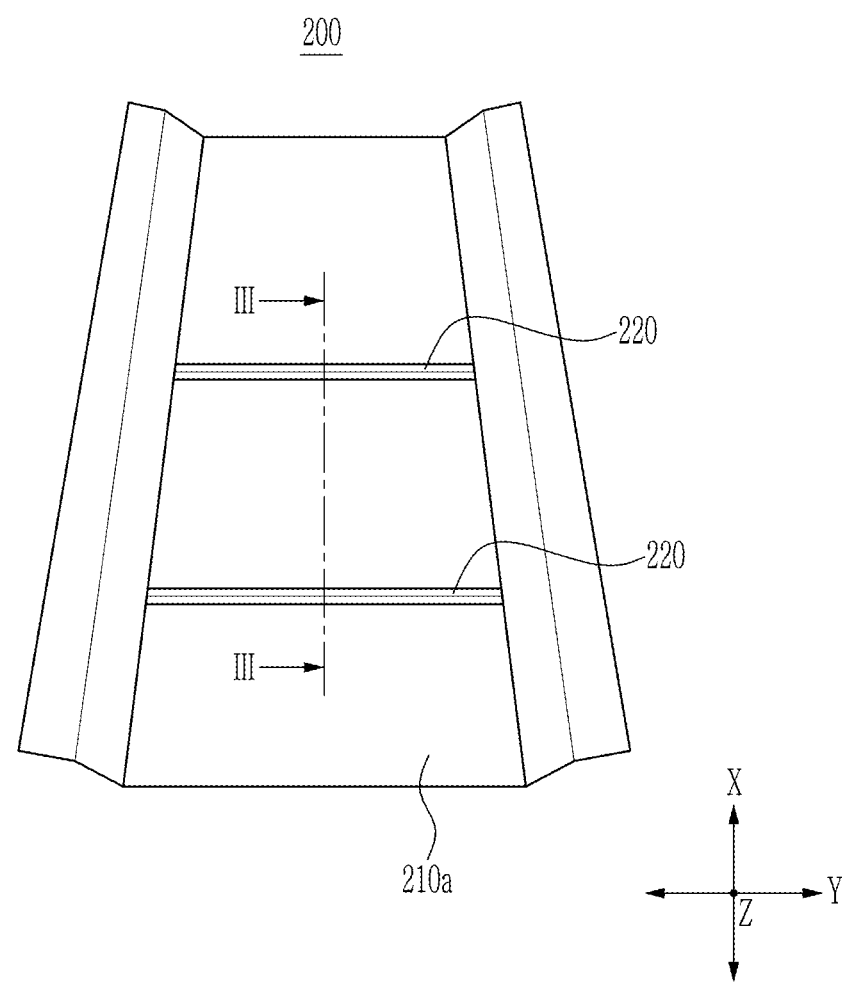
FIG. 2 is a plan view showing an enlarged view of a trough in FIG. 1.
Figure 3:
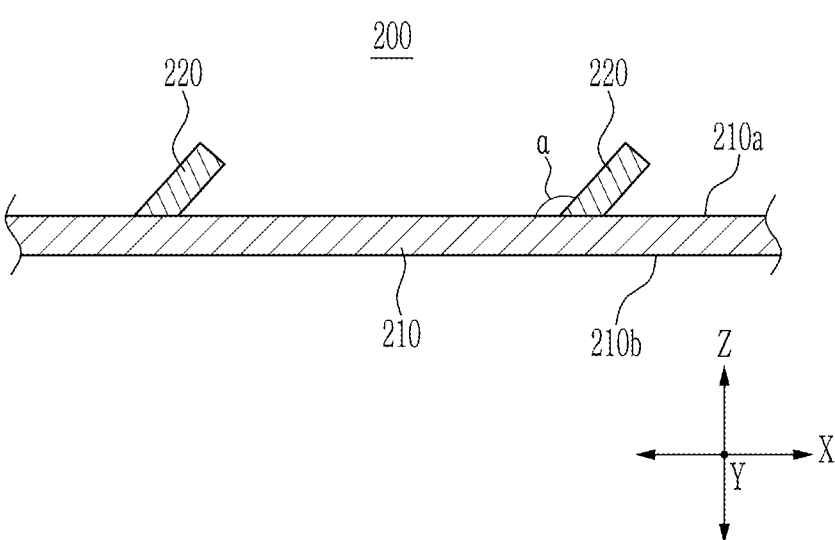
FIG. 3 is a cross-sectional view taken along line III-III of FIG. 2.

FIG. 2 is an enlarged top plan view of the trough 200 in FIG. 1. FIG. 3 is a cross-sectional view taken along line III-III of FIG. 2.

Referring to FIGS. 1 to 3, the trough 200 may include a bottom 210, a plurality of bottom pattern portions 220, and a vibrator 230. For example, referring to FIGS. 1 to 3, the trough 200 may have a shape of an open trench or an open channel extending in parallel to a surface supporting the dry powder feeding apparatus, such that the bottom 210 of the trough 200 may be the bottom of the trench or channel, sidewalls may extend from the bottom 210 of the through 200 along the length of the bottom 210, and a top of the trough 200 may be open. For example, as illustrated in FIGS. 1 to 3, the bottom 210 of the trough 200 may be between the bottom pattern portions 220 and the vibrator 230.

For example, as illustrated in FIGS. 1 to 3, the bottom 210 of the trough 200 may include an inner surface 210a facing the feeder 100 and an outer surface 210b opposite the inner surface 210a and facing the vibrator 230. The bottom 210 may extend lengthwise in the first direction X, and may have a predetermined width in a second direction Y that intersects the first direction X. The bottom 210 may be vibrated by the vibrator 230, and the dry powder DP discharged from the feeder 100 into the trough 200 (i.e., the dry powder DP on the inner surface 210a of the bottom 210) may move in the first direction X along the inner surface 210a of the bottom 210.

The plurality of bottom pattern portions 220 may protrude from the inner surface 210a of the bottom 210 in the third direction Z that intersects the first direction X and the second direction Y, e.g., the plurality of bottom pattern portions 220 may protrude from the inner surface 210a toward the feeder 100. For example, as illustrated in FIG. 2, the plurality of bottom pattern portions 220 may be spaced apart from each other along the first direction X, and each of plurality of bottom pattern portions 220 may extend continuously in the second direction Y along an entire width of the bottom 210. In implementation, the plurality of bottom pattern portions 220 protrude from the bottom 210 toward the feeder 100, and the dry powder DP passing along the bottom 210 may be widely dispersed in the second direction Y on the bottom 210 by the plurality of bottom pattern portions 220 that vibrate due to vibration of the bottom 210.

Each of the plurality of bottom pattern portions 220 may be slanted (e.g., inclined or angled) at an oblique angle with respect to the inner surface 210a of the bottom 210, e.g., each of the plurality of bottom pattern portions 220 may protrude from the inner surface 210a of the bottom 210 at an obtuse angle α with respect to the inner surface 210a of the bottom 210. For example, the plurality of bottom pattern portions 220 may form an obtuse angle with respect to the inner surface 210a of the bottom 210 in the first direction X, e.g., the plurality of bottom pattern portions 220 may be oriented to be inclined away from the feeder 100. In implementation, the plurality of bottom pattern portions 220 protrude at an oblique angle from the inner surface 210a of the bottom 210 in a direction oriented away from the feeder 100, and the dry powder DP passing along the bottom 210 may be widely dispersed in the first direction X and the second direction Y on the inner surface 210a of the bottom 210 by the plurality of bottom pattern portions 220 that vibrate due to vibration of the bottom 210.

The plurality of bottom pattern portions 220 may be spaced apart from each other in the first direction X. The plurality of bottom pattern portions 220 may extend in the second direction Y that intersects the first direction X in a plan view. In implementation, the plurality of bottom pattern portions 220 extend in the second direction Y that is a width direction of the bottom 210 to protrude from the inner surface 210a of the bottom, and the dry powder DP passing along the bottom 210 may be widely dispersed in the second direction Y on the bottom 210 by the plurality of bottom pattern portions 220 that vibrate due to vibration of the bottom 210.

The plurality of bottom pattern portions 220 may have the same shape. For example, as illustrated in FIG. 2, the plurality of bottom pattern portions 220 may have a line shape extending in the second direction Y that is the width direction of the bottom 210 in a plan view, e.g., the plurality of bottom pattern portions 220 may have linear shapes parallel to each other in a top view.

Figure 4:
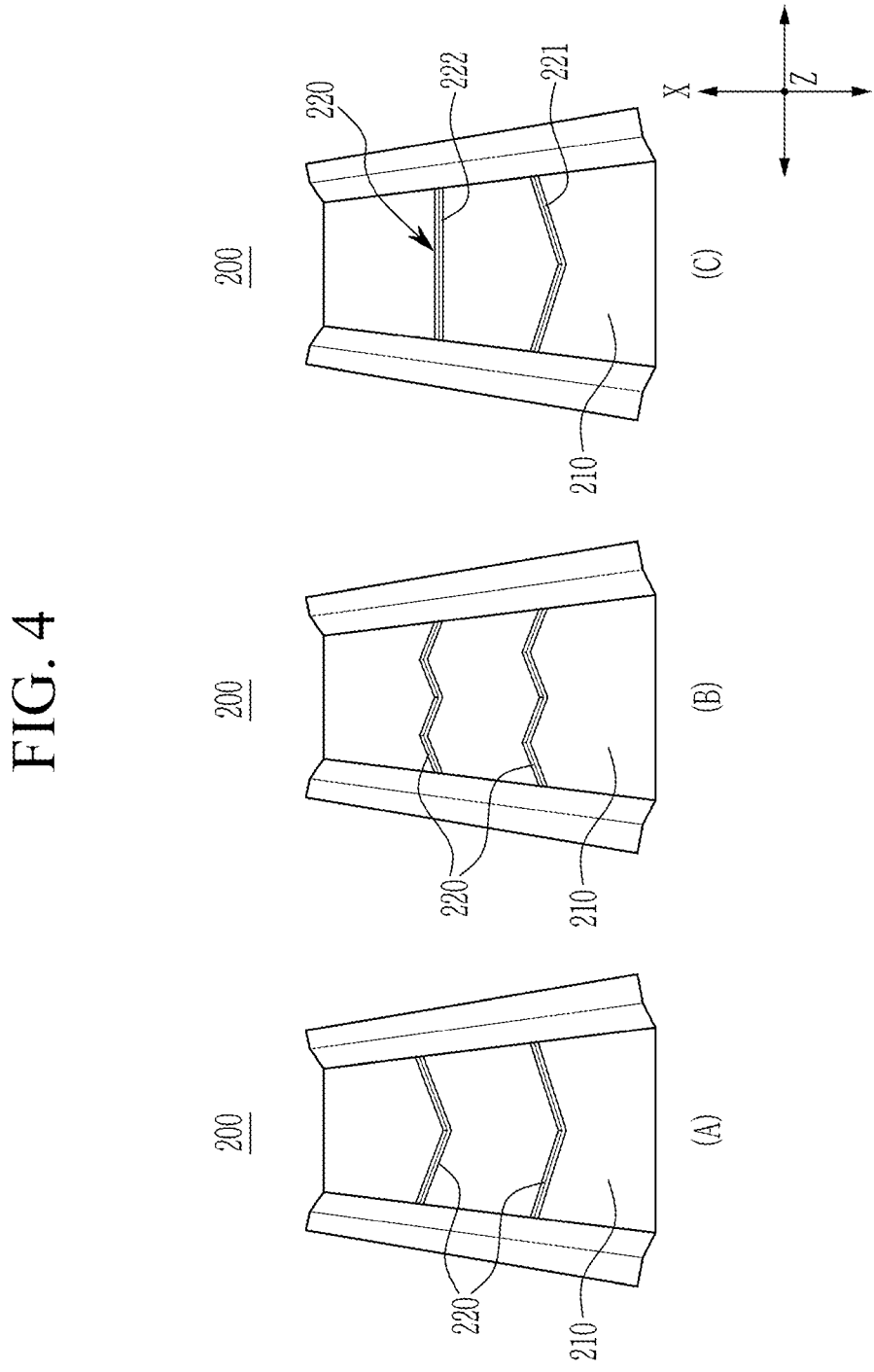
FIG. 4 is a plan view showing examples of a trough of a dry powder feeding apparatus according to embodiments.

FIG. 4 is a plan view illustrating examples of a trough of a dry powder feeding apparatus according to embodiments.

For example, referring to part (A) of FIG. 4, the plurality of bottom pattern portions 220 may have a V-shape extending in the second direction Y in a plan (e.g., top) view. For example, each of the plurality of bottom pattern portions 220 may have a bent shape, e.g., may include a single bend, the same as and aligned with an adjacent one of the plurality of bottom pattern portions 220, as viewed in a top view.

For example, referring to part (B) of FIG. 4, the plurality of bottom pattern portions 220 may have an M-shape extending in the second direction Y in a plan view. For example, each of the plurality of bottom pattern portions 220 may have a bent shape, e.g., may include multiple bends, the same as and aligned with an adjacent one of the plurality of bottom pattern portions 220, as viewed in a top view.

For example, referring to part (C) of FIG. 4, the plurality of bottom pattern portions 220 may have different shapes, as viewed in a top view. For example, the plurality of bottom pattern portions 220 may include a first bottom pattern portion 221 and a second bottom pattern portion 222 spaced apart in the first direction X. The first bottom pattern portion 221 may have a V-shape extending in the second direction Y in a plan view, and the second bottom pattern portion 222 may have a line shape extending in the second direction Y in a plan view. As another example, each of the plurality of bottom pattern portions 220 may have various shapes, e.g., a curved shape, a circular shape, an oval shape, a quadrangular shape, a triangular shape, and an irregular shape in a plan view.

Referring to FIG. 1, the vibrator 230 may be disposed on the outer surface 210b of the bottom 210 of the trough 200. The vibrator 230 may vibrate the bottom 210 of the trough 200 using any suitable vibration means.

As further illustrated in FIG. 1, the chute 300 may be disposed between the feeder 100 and the trough 200. The chute 300 may guide the dry powder DP discharged from the feeder 100 to the trough 200. The dry powder DP passing through the chute 300 from the feeder 100 may be dispersed in the second direction Y that is a width direction of the trough 200.

Figure 5:
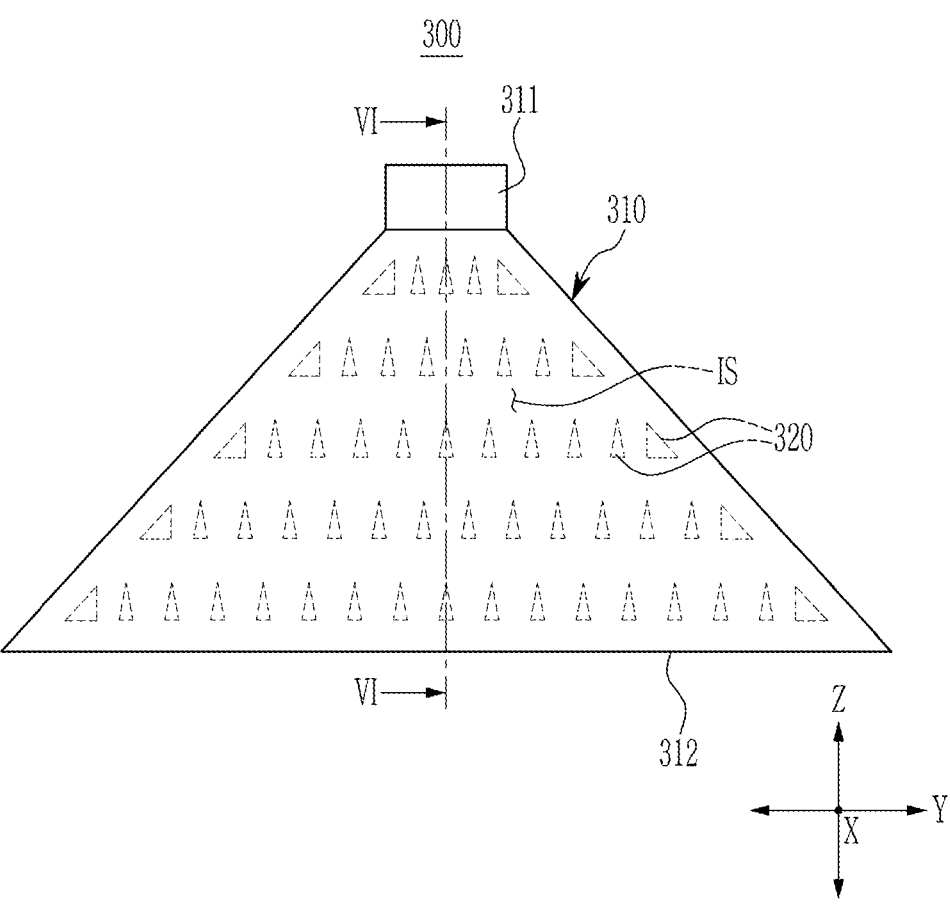
FIG. 5 is a front view showing an enlarged view of a chute in FIG. 1.
Figure 6:
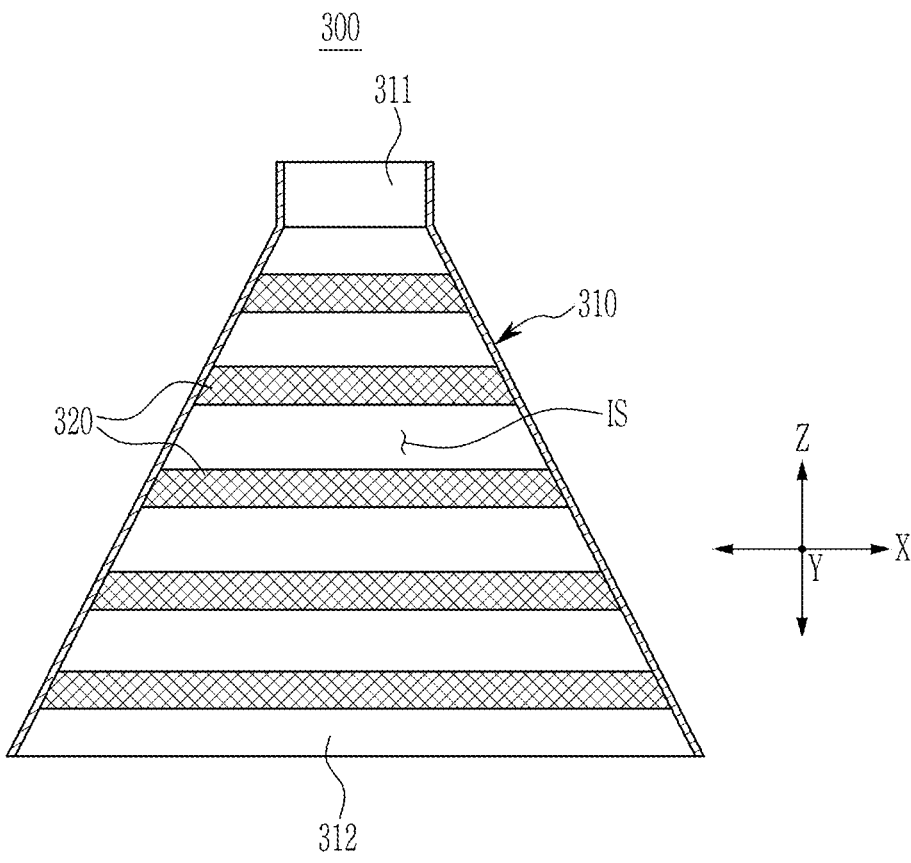
FIG. 6 is a cross-sectional view taken along line VI-VI of FIG. 5.

FIG. 5 is an enlarged front view of the chute 300 in FIG. 1. FIG. 6 is a view seen when facing a cross-section along line VI-VI of FIG. 5. It is noted that FIG. 6 illustrates a depth view seen when facing half the chute 300 cut along line VI-VI of FIG. 5.

Referring to FIGS. 1, 5, and 6, the chute 300 may include a main body 310 and a plurality of internal pattern portions 320.

As illustrated in FIG. 5, the main body 310 may include an internal space IS through which the dry powder DP passes, an inlet 311 through which the dry powder DP discharged from the feeder 100 is supplied into the main body 310, and an outlet 312 through which the dry powder DP is discharged from the main body 310 into the trough 200. For example, as illustrated in FIG. 5, the inlet 311 and outlet 312 may be on opposite sides of the internal space IS of the main body 310 along the third direction Z.

The internal space IS may be formed by expanding from the inlet 311 to the outlet 312 in the third direction Z that is a direction in which the main body 310 extends. That is, a width of the main body 310 may, e.g., gradually, increase in a direction oriented from the inlet 311 toward the outlet 312. The internal space IS may have a shape of an internal space of any suitable chute, e.g., a shape of a cone or a pyramid.

The inlet 311 may be disposed at an upper side of the internal space IS in the third direction Z, e.g., the inlet 311 may face the feeder 100. The inlet 311 may be a portion where the dry powder DP discharged from the feeder 100 is supplied.

The outlet 312 may be disposed at a lower side of the internal space IS in the third direction Z, e.g., the outlet 312 may face the trough 200. The outlet 312 may be a portion where the dry powder DP is discharged from the inlet 311 through the internal space IS. The dry powder DP may be discharged from the outlet 312 to the trough 200. The outlet 312 may have a wider width than that of the inlet 311, e.g., in the first direction X and/or the second direction Y. A width of the outlet 312 may be greater than a width of the inlet 311. For example, a width of the outlet 312 may include at least one of a width of the first direction X and a width of the second direction Y.

The plurality of internal pattern portions 320 may be disposed in the internal space IS of the main body 310. The plurality of internal pattern portions 320 may be distributed and disposed in the internal space IS from the inlet 311 of the main body 310 to the outlet 312 of the main body 310.

For example, as illustrated in FIG. 6, the plurality of internal pattern portions 320 may extend in the first direction X to be connected (e.g., directly connected) to an internal wall of the main body 310, e.g., each pf the plurality of internal pattern portions 320 may extend continuously in the first direction X to be connected (e.g., directly connected) to opposite internal walls of the main body 310. The plurality of internal pattern portions 320 may be distributed and disposed, e.g., spaced apart from each other, in the second direction Y and the third direction Z in the internal space IS of the main body 310. For example, referring to FIG. 5, the rows of internal pattern portions 320 may be offset relative to each other in the second direction Y, but a viewer with respect to FIG. 6 may still face three internal pattern portions 320 that are on line VI-VI of FIG. 5 and additional two internal pattern portions 320 that are offset from the line VI-VI of FIG. 5 along the second direction Y.

For example, as illustrated in FIG. 5, each of the plurality of internal pattern portions 320 may have a triangular shape in the third direction Z, e.g., a triangular cross-section in a plane defined by the second and third directions Y and Z that is oriented to have an increasing width toward the outlet 312. In another example, each of the plurality of internal pattern portions 320 may have any suitable polygonal shape (e.g., a quadrangular shape, a pentagonal shape, a hexagonal shape, or the like), circular shape, oval shape, linear shape, curved shape, and the like.

For example, the plurality of internal pattern portions 320 may be distributed and disposed, e.g., spaced apart from each other, in the second direction Y and the third direction Z in the internal space IS of the main body 310, so that the dry powder DP supplied from the feeder 100 to the inlet 311 collides with the plurality of internal pattern portions 320 to be widely dispersed (e.g., via the offset and spaced apart triangular shapes) in the second direction Y while passing through the internal space IS in the third direction Z.

Figure 7:
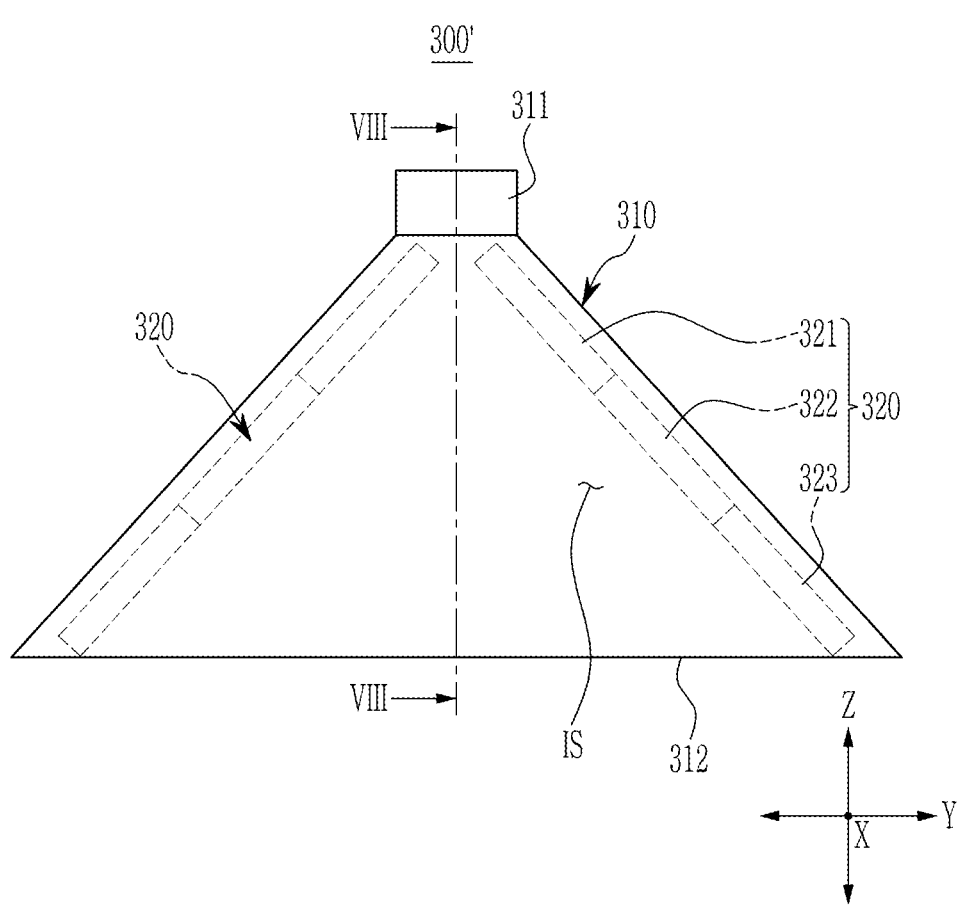
FIG. 7 is a front view showing an enlarged view of a chute of a dry powder feeding apparatus according to other embodiments.
Figure 8:
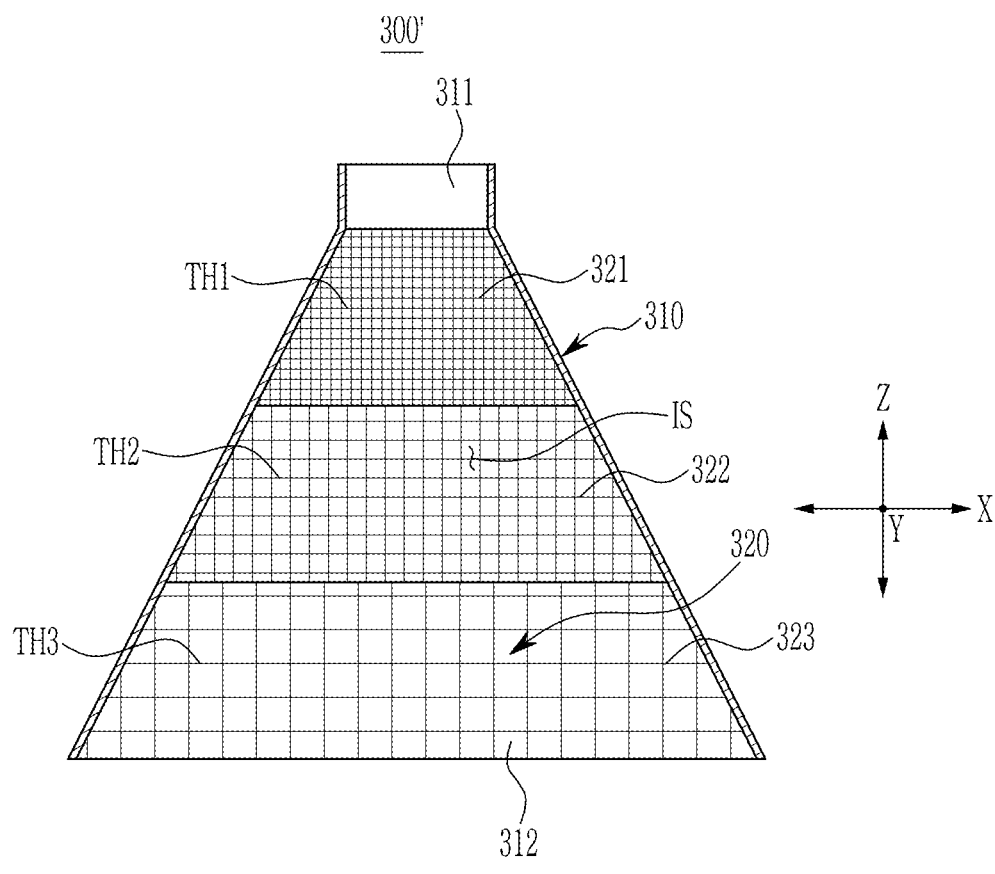
FIG. 8 is a cross-sectional view taken along line VIII-VIII of FIG. 7.

FIG. 7 is a front view of a chute 300' of a dry powder feeding apparatus according to example embodiments. FIG. 8 is a cross-sectional view taken along line VIII-VIII of FIG. 7. It is noted that FIG. 8 illustrates a depth view seen when facing half the chute 300' cut along line VIII-VIII of FIG. 7.

For example, referring to FIGS. 1, 7, and 8, the dry powder feeding apparatus may include the feeder 100, the trough 200, and the chute 300' therebetween. Each of the plurality of internal pattern portions 320 of the chute 300' may include a mesh extending from the inlet 311 of the main body 310 toward an outer region of the outlet 312 of the main body 310. For example, the mesh may extend from a central region of the inlet 311 to the outer region of the outlet 312 along the internal wall of the main body 310, and the mesh may extend in the first direction X, the second direction Y, the third direction Z, or another direction to be connected to the internal wall of the main body 310. For example, referring to FIG. 7, the plurality of internal pattern portions 320 may have a predetermined thickness along a radial direction of the chute 300' and may extend along the internal wall of the main body 310 (i.e., the dashed rectangles in FIG. 7) to surround an empty space of the internal space IS.

The mesh included in the internal pattern portion 320 may include a first sub-mesh 321, a second sub-mesh 322, and a third sub-mesh 323, e.g., stacked on top of each other in the third direction Z. For example, as illustrated in FIG. 8, sizes of the holes in the first through third sub-meshes may gradually increase from the inlet 311 toward the outlet 312 (e.g., FIG. 8 illustrates the mesh as it extends along the sidewall of the main body 310 and is spaced apart from the center of the chute 300').

The first sub-mesh 321 may be adjacent to the inlet 311 of the main body 310, and may include a first through hole TH1. The second sub-mesh 322 may extend from the first sub-mesh 321 toward the outlet 312, and may include a second through hole TH2 that is larger than the first through hole TH1. The second sub-mesh 322 may connect the first sub-mesh 321 and the third sub-mesh 323. The third sub-mesh 323 may extend from the second sub-mesh 322 toward the outlet 312, and may include a third through hole TH3 that is larger than the second through hole TH2.

For example, each of the plurality of internal pattern portions 320 may include the mesh extending from the inlet 311 of the main body 310 to the outer region of the outlet 312 of the main body 310, so that the dry powder DP supplied from the feeder 100 to the inlet 311 sequentially passes through the first through hole TH1 of the first sub-mesh 321 of the mesh, the second through hole TH2 of the second sub-mesh 322 of the mesh, and the third through hole TH3 of the third sub-mesh 323 of the mesh to be widely dispersed in the second direction Y while passing through the internal space IS in the third direction Z.

For example, in the dry powder feeding apparatus according to example embodiments, the dry powder DP discharged from the feeder 100 may collide with the plurality of internal pattern portions 320 to be widely dispersed in the second direction Y while passing through the chute 300 (or chute 300') in the third direction Z so that the dry powder DP discharged from the feeder 100 is moved to the trough 200. The dry powder DP passing along the bottom 210 of the trough 200 in the first direction X may be widely dispersed in the second direction Y on the bottom 210 by the plurality of bottom pattern portions 220 that vibrate due to vibration of the bottom 210 so that the dry powder DP passing along the bottom 210 of the trough 200 in the first direction X is moved to the dry electrode manufacturing apparatus.

By way of summation and review, a dry powder feeding apparatus may include a feeder that discharges a fibrous dry powder, and a trough that moves the dry powder discharged from the feeder in one direction to supply the dry powder to a roll that performs calendering. However, the dry powder discharged from the feeder may not be widely dispersed on the trough due to low dispersibility and high cohesiveness of the fibrous dry powder, so that supply deviation may occur in the dry powder supplied to the roll performing calendering.

In contrast, example embodiments provide a dry powder feeding apparatus that manufactures a large-area dry electrode with improved uniformity because a supply deviation of a dry powder supplied to a roll performing calendering is minimized by widely dispersing a fibrous dry powder discharged from a feeder on a trough. That is, the dry powder feeding apparatus according to example embodiments includes internal pattern portions within the chute and bottom pattern portions inside the trough to increase dispersion distribution of the dry powder within the trough along a direction perpendicular to a length direction of the trough, thereby reducing supply deviation and increasing uniformity of the dry powder supplied to the calendering roll.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A dry powder feeding apparatus, comprising:
a feeder accommodating a fibrous dry powder, the fibrous dry powder including an active material, a conductive material, and a binder;
a trough adjacent to the feeder, the trough including a bottom and a plurality of bottom pattern portions protruding from an inner surface of the bottom, the bottom of the trough being configured to move the fibrous dry powder discharged from the feeder in a first direction; and
a chute between the feeder and the trough, the chute being configured to guide the dry powder discharged from the feeder to the trough.

2. The dry powder feeding apparatus as claimed in claim 1, wherein the plurality of bottom pattern portions protrude at an obtuse angle from the inner surface of the bottom.

3. The dry powder feeding apparatus as claimed in claim 2, wherein the plurality of bottom pattern portions form an obtuse angle with respect to the inner surface of the bottom in the first direction.

4. The dry powder feeding apparatus as claimed in claim 1, wherein the plurality of bottom pattern portions are spaced apart from each other in the first direction.

5. The dry powder feeding apparatus as claimed in claim 1, wherein the plurality of bottom pattern portions extend in a second direction intersecting the first direction in a plan view.

6. The dry powder feeding apparatus as claimed in claim 5, wherein the plurality of bottom pattern portions have the same shape.

7. The dry powder feeding apparatus as claimed in claim 6, wherein the plurality of bottom pattern portions have a line shape in the plan view.

8. The dry powder feeding apparatus as claimed in claim 6, wherein the plurality of bottom pattern portions have a V-shape in the plan view.

9. The dry powder feeding apparatus as claimed in claim 6, wherein the plurality of bottom pattern portions have an M-shape in the plan view.

10. The dry powder feeding apparatus as claimed in claim 5, wherein the plurality of bottom pattern portions have different shapes from each other in the plan view.

11. The dry powder feeding apparatus as claimed in claim 10, wherein the plurality of bottom pattern portions include a first bottom pattern portion and a second bottom pattern portion spaced apart from each other in the first direction, the first bottom pattern portion has a V-shape in the plan view, and the second bottom pattern portion has a line shape in the plan view.

12. The dry powder feeding apparatus as claimed in claim 1, wherein the trough further includes a vibrator configured to vibrate the bottom.

13. The dry powder feeding apparatus as claimed in claim 1, wherein the chute includes:
  a main body having an internal space through which the dry powder passes; and
  a plurality of internal pattern portions in the internal space.

14. The dry powder feeding apparatus as claimed in claim 13, wherein the main body further includes:
  an inlet at an upper side of the internal space, the dry powder being discharged from the feeder into the chute through the inlet; and
  an outlet at a lower side of the internal space, the dry powder being discharged from the chute to the trough through the outlet, and the outlet having a wider width than the inlet.

15. The dry powder feeding apparatus as claimed in claim 14, wherein the plurality of internal pattern portions are spaced apart from each other in the internal space from the inlet to the outlet.

16. The dry powder feeding apparatus as claimed in claim 15, wherein the plurality of internal pattern portions have a triangular shape in a third direction intersecting the first direction.

17. The dry powder feeding apparatus as claimed in claim 14, wherein each of the plurality of internal pattern portions includes a mesh extending from the inlet to an outer region of the outlet.

18. The dry powder feeding apparatus as claimed in claim 17, wherein the mesh includes:
  a first sub-mesh that is adjacent to the inlet and includes a first through hole;
  a second sub-mesh that extends from the first sub-mesh to the outlet and includes a second through hole larger than the first through hole; and
  a third sub-mesh that extends from the second sub-mesh to the outlet and includes a third through hole larger than the second through hole.

19. A dry powder feeding apparatus, comprising:
  a feeder accommodating a fibrous dry powder, the fibrous dry powder including an active material, a conductive material, and a binder;
  a trough adjacent to the feeder, the trough being configured to move the dry powder discharged from the feeder in one direction; and
  a chute between the feeder and the trough, the chute including a main body having an internal space and a plurality of internal pattern portions in the internal space, the internal space guiding the dry powder discharged from the feeder to the trough.

\* \* \* \* \*